United States Patent
Bell, Jr. et al.

(10) Patent No.: US 8,751,751 B2
(45) Date of Patent: Jun. 10, 2014

(54) METHOD AND APPARATUS FOR MINIMIZING CACHE CONFLICT MISSES

(75) Inventors: Robert H. Bell, Jr., Austin, TX (US); Men-Chow Chiang, Austin, TX (US); Hong L. Hua, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 13/015,771

(22) Filed: Jan. 28, 2011

(65) Prior Publication Data

US 2012/0198121 A1    Aug. 2, 2012

(51) Int. Cl.
    *G06F 12/00*      (2006.01)
    *G06F 12/08*      (2006.01)
    *G06F 12/10*      (2006.01)
(52) U.S. Cl.
    CPC ........ *G06F 12/0864* (2013.01); *G06F 12/1018* (2013.01); *G06F 12/1036* (2013.01)
    USPC ................. 711/145; 711/3; 711/144
(58) Field of Classification Search
    CPC ............ G06F 12/0864; G06F 12/1018; G06F 12/1036
    USPC .............................. 711/3, 144, 145
    See application file for complete search history.

(56) References Cited

U.S. PATENT DOCUMENTS

| | | | |
|---|---|---|---|
| 5,893,150 A | | 4/1999 | Hagersten |
| 6,012,132 A | * | 1/2000 | Yamada et al. ................ 711/207 |
| 7,272,832 B2 | * | 9/2007 | Gardner ........................ 718/105 |
| 7,395,373 B2 | | 7/2008 | Robinson |
| 2003/0101322 A1 | * | 5/2003 | Gardner ........................ 711/163 |
| 2003/0208665 A1 | * | 11/2003 | Peir et al. ...................... 711/169 |
| 2007/0233964 A1 | | 10/2007 | Robinson |
| 2007/0234016 A1 | * | 10/2007 | Davis et al. .................... 712/227 |
| 2009/0287901 A1 | * | 11/2009 | Abali et al. .................... 711/206 |

* cited by examiner

*Primary Examiner* — Reba I Elmore
(74) *Attorney, Agent, or Firm* — Yudell Isidore Ng Russell PLLC

(57) ABSTRACT

A method for minimizing cache conflict misses is disclosed. A translation table capable of facilitating the translation of a virtual address to a real address during a cache access is provided. The translation table includes multiple entries, and each entry of the translation table includes a page number field and a hash value field. A hash value is generated from a first group of bits within a virtual address, and the hash value is stored in the hash value field of an entry within the translation table. In response to a match on the entry within the translation table during a cache access, the hash value of the matched entry is retrieved from the translation table, and the hash value is concatenated with a second group of bits within the virtual address to form a set of indexing bits to index into a cache set.

18 Claims, 3 Drawing Sheets

METHOD AND APPARATUS FOR MINIMIZING CACHE CONFLICT MISSES

BACKGROUND OF THE INVENTION

1. Technical Field

The present disclosure relates to cache memories in general, and in particular to a method and apparatus for minimizing conflict misses in cache memories.

2. Description of Related Art

Cache misses can generally be categorized into three types, namely, cold access misses (i.e., when cache lines are first accessed), capacity misses (i.e., misses caused by demanding a cache line that was cast out previously), and conflict misses (i.e., misses caused by heavily accessed cache lines being mapped to the same set within a cache). To a certain extent, cold access misses can be reduced by hardware or software prefetching. Capacity misses can be reduced by increasing the size of a cache. Conflict misses can be reduced by using higher degrees of cache set associativity.

There is a practical upper limit to increasing set associativity due to increase in logic complexity and possible reduction in cache access speed. In addition, certain unique developments in system and application software of modern processor systems have created a source of cache conflict misses that cannot be effectively reduced by increasing the degree of cache set associativity. It turns out that many pages, whether accessed for instructions or data, have a common layout for their data structures such that when a particular datum in a page becomes more frequently accessed than others, then the data at the same relative location in many other pages (that is, with the same page offset) that use the same structural layout also experience more frequent access than others. This can happen in, for example, database applications in which layouts of memory pages and accesses are carefully managed. This phenomenon becomes a major cause of additional cache conflict misses due to the way that cache entries are addressed.

Consequently, it would be desirable to provide an improved method and apparatus for minimizing conflict misses in cache memories.

SUMMARY OF THE INVENTION

In accordance with a preferred embodiment of the present disclosure, a translation table capable of facilitating the translation of a virtual address to a real address during a cache access is provided. The translation table includes multiple entries, and each entry of the translation table includes a page number field and a hash value field. A hash value is generated from a first group of bits within a virtual address, and the hash value is stored in the hash value field of an entry within the translation table. In response to a match on the entry within the translation table during a cache access, the hash value of the matched entry is retrieved from the translation table, and the hash value is concatenated with a second group of bits within the virtual address to form a set of indexing bits to index into a cache set.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
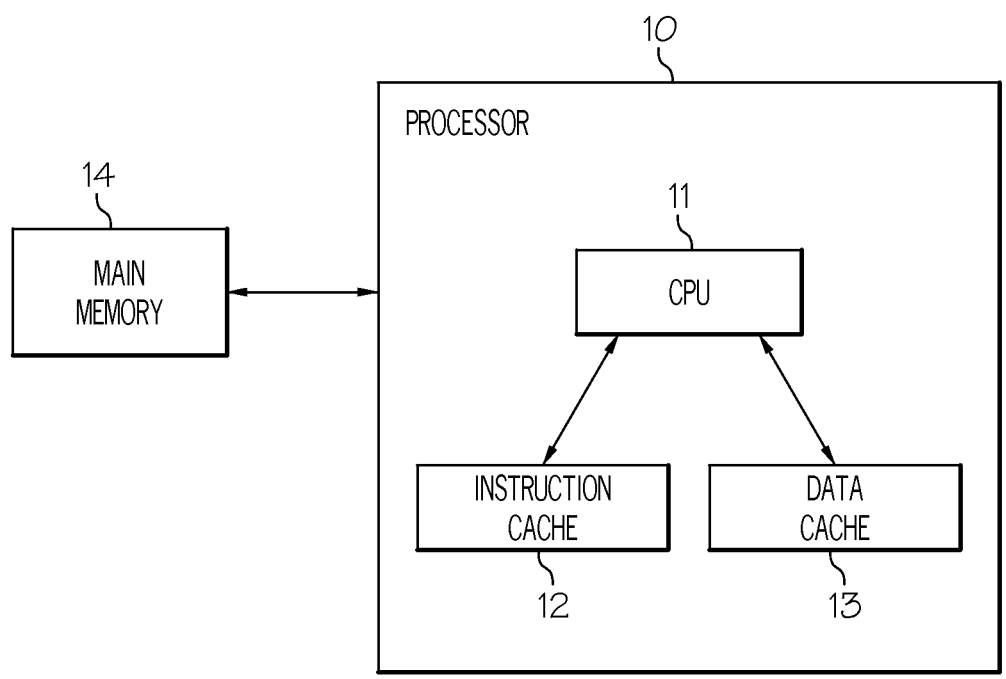
FIG. 1 is a block diagram of a processor in which a preferred embodiment of the invention can be implemented.

Referring now to the drawings and in particular to FIG. 1, there is depicted a block diagram of a processor in which a preferred embodiment of the invention can be implemented. As shown, processor 10 includes a central processing unit (CPU) 11, an instruction cache 12, and a data cache 13. CPU 11 is preferably connected to instruction cache 12 and data cache 13 via respective high bandwidth buses. Processor 10 is also coupled to a main memory 14. Both instruction cache 12 and data cache 13 are high speed set-associative caches that enable processor 10 to achieve a relatively fast access time to a subset of instructions or data previously transferred from main memory 14.

In a cache implementation, information is stored in one or several memory arrays. In addition, corresponding tags for each cache line are stored in a structure known as a cache directory. Usually, an additional structure, called a translation lookaside buffer (TLB), is utilized to facilitate the translation of a virtual address to a real address during a cache access.

In order to minimize cache access time, only a small number of bits should be used to hash addresses into a cache. The most popular cache indexing scheme in use today selects address bits right above cache lines for indexing the sets within a cache.

Figure 2:
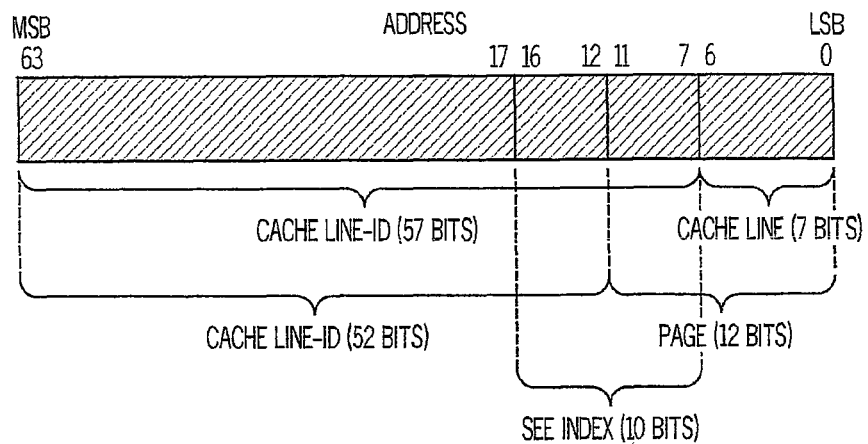
FIG. 2 is a diagram of a conventional cache indexing scheme.

With reference now to FIG. 2, there is depicted a diagram of a conventional cache indexing scheme. The cache indexing scheme is based on a processor having, for example, a 1 Mbyte, 8 way-set associative cache using a 128-byte line size. Thus, the cache has (1 Mbyte/8 way/128 byte)=1 K cache sets. If there are 64 address bits, the 7 least significant bits (LSBs), i.e., bits 0-6, will be used for intra-line addressing, and the next 10 LSB, i.e., bits 7-16, will be used to index into a particular cache set. Suppose the data at the first 128 byte of a 4 Kbyte page is accessed much more frequently than all other data in the same page. Then, cache sets [0, 32, 64, 96, . . . ] will have disproportionately higher conflict miss ratios compared to the other cache sets because the first cache lines of all the pages with the same data structure layout are mapped to all these particular sets, i.e., to one of cache sets [0, 32, 64, 96 . . . ]. As shown in FIG. 2, the cache line-ID for this example is defined as the 57 most significant bits (MSBs), i.e., bits 7-63, of the 64-bit address. All 57 MSBs are located above the $7^{th}$ LSB, which are the cache line addresses. Similarly, the page-ID is defined as the 52 MSBs, i.e., bits 12-63, of the 64-bit address. All 52 MSBs are located above the $12^{th}$ LSB, which are the page addresses.

The above-mentioned method for choosing address bits can result in a concentration of frequent cache accesses to only a small number of cache sets, which may lead to a much higher number of conflict misses in those cache sets than other cache sets. There are at least three prior art methods for reducing cache conflict misses, and they are full address hashing, random starting page offset, and stagger memory allocation for a page.

i. Full Address Hashing

The ideal method for reducing the type of highly skewed access pattern to cache sets, as described above, is to use all the address bits of a cache line to hash into a cache directory. This method essentially randomizes the addresses better by using the maximum spread of sets via all available bits. Using the cache indexing example shown in FIG. 2, this means all 57 MSBs (i.e., the cache line-ID) are utilized to hash into a 10-bit quantity as an index to a particular cache set.

Figure 3:
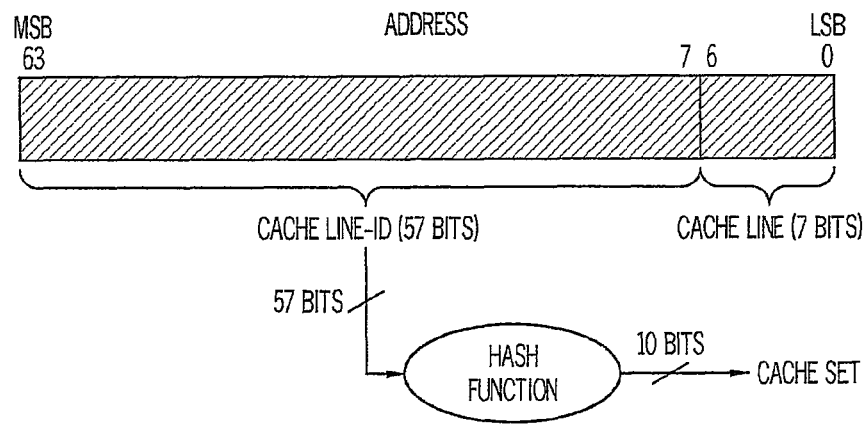
FIG. 3 illustrates a full address hashing methodology.

The full address hashing methodology is illustrated in FIG. 3. When a processor uses a large number of address bits (such as 64 bits) for its addressing scheme, a multi-stage combinatorial logic circuit is required to generate the hash value. The multi-stage combinatorial logic circuit is typically made up of XOR gates. In addition, the levels of logic in such a logic circuit can be in the order of the log (base 2) of the number of bits in the logic circuit. In the present example, the 57 bits of the cache line-ID would require a 7-stage XOR gate network (assuming 8 bits or fewer for the final hash value). A 7-stage XOR gate network, if used to access the cache on every cache access, would likely impact either the processor cycle time and/or the cache access latency negatively, and thus it is not an acceptable solution from a performance perspective.

ii. Random Starting Page Offset

This method requires programmers and/or compiler designers to layout instructions or data in their application programs with random starting offsets within a page. But this is not only programmer-labor intensive, it would also waste storage space in many pages of a main memory because most likely the starting portions of many pages would not used. If true random assignment is used, up to 50% of the main memory would likely be wasted. Therefore, this method should only be used judiciously, which is a limitation of this method in itself.

In addition, this method also requires intimate knowledge of the data usage and the layouts being used in system software or applications in order to select some data structures for random page starting offsets during memory allocation. Currently, human effort is needed in order to uncover the above-mentioned data structures, which can be very time-consuming and error prone.

iii. Stagger Memory Allocation for a Page

This method staggers the page allocation in memory so that pages with similar data layout are mapped to different regions of a cache. The operating system will maintain multiple pools of free pages with each pool mapped to a different, non-overlapping region of the cache. When a real page needs to be allocated, the operating system can simply randomize the allocation via a round-robin scheme through the pools of free pages.

However, staggered allocation of pages is not always effective, and it is even less effective when the page size is so large that a page spans across a large part or the entire cache. This is because the effectiveness of randomizing the hot cache lines causing the conflict miss as described above, is proportional to the number of free page pools. Staggering scheme attempts to spread evenly heavily assessed cache lines across all the pools, but the number of pools is inversely proportional to the page size. Thus, with large page size staggering is not very effective in reducing cache conflict misses.

Continuing with the cache indexing example shown in FIG. 2, staggered allocation of pages may help to spread frequent cache accesses more evenly among cache sets [0, 32, 64, 96 . . . ], which somewhat relieves the problem of skew-distribution of cache accesses. But with a large page size, such as 128 Kbyte or larger, all the first cache lines of the large pages will be mapped to cache set 0, and eventually all the frequent cache accesses will concentrate on cache set 0, with or without staggered allocation of pages.

Since the above-mentioned prior art methods generally do not yield the best results, what's needed is a way to obtain maximum address spreading of the full address hash solution while without degrading cache performance.

Cache conflict misses can be minimized if the address bits for real page-ID are included in the hash for indexing into a cache directory. Hash values can be generated from the real page-ID portion of the address bits for pages actively being accessed by a processor, and the values are stored inside the processor.

Thus, in accordance with a preferred embodiment of the present invention, hash values are generated from the real page-ID portion of the address bits for all pages being actively accessed by processors, and these values are stored in a convenient hardware structure, such as within a TLB, within a processor chip. The stored hash values are relatively small, such as 5 to 10 bits.

Figure 4A:
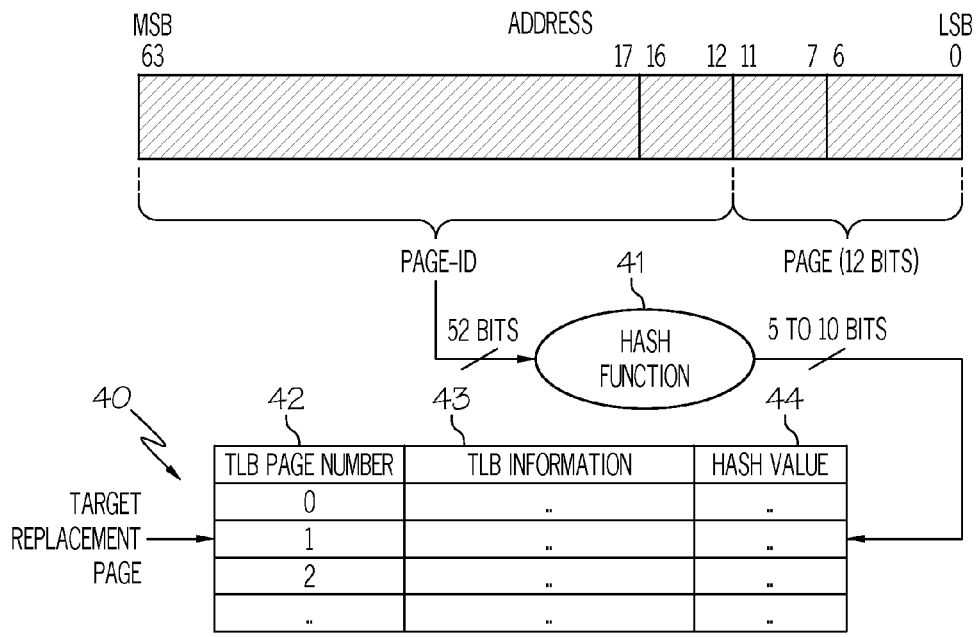
FIGS. 4*a*-4*b* illustrate a method and apparatus for minimizing conflict misses in caches, in accordance with a preferred embodiment of the present invention.
Figure 4B:
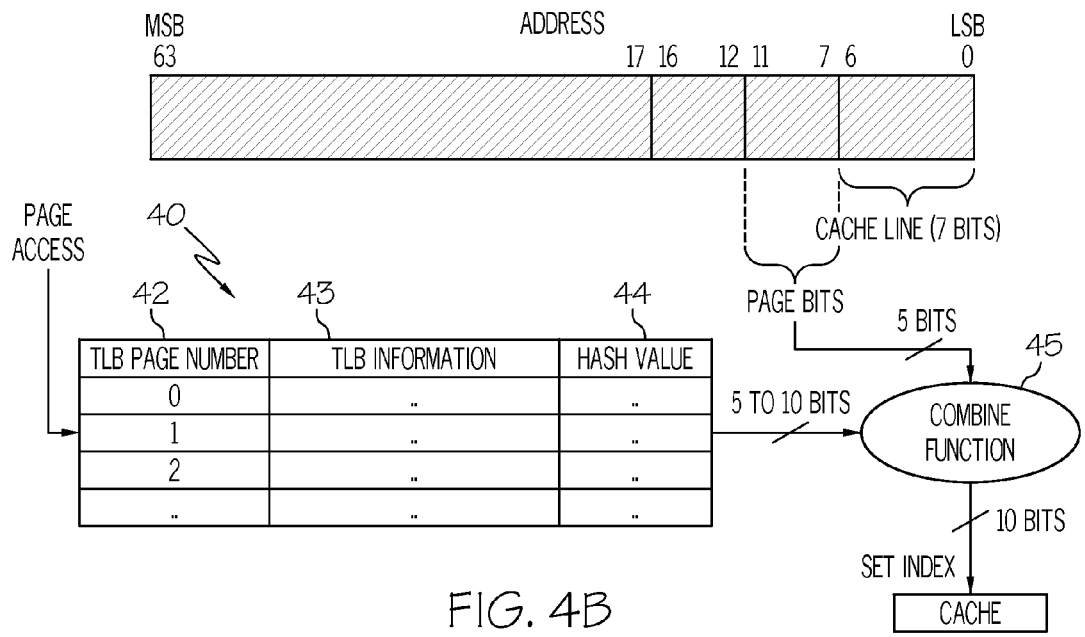

With reference now to FIGS. 4a-4b, there are illustrated a method and apparatus for minimizing conflict misses in caches, in accordance with a preferred embodiment of the present invention. As shown, the cache indexing scheme is based on a 64-bit addressing system having, for example, a 1 Mbyte, 8-way set-associative cache with 128-byte cache lines. With this system, a 5-bit to 10-bit hash value can be generated from a 52-bit page-ID for a 4 Kbyte page.

Initially, a hash value is generated by sending a 52-bit page-ID through a hash function 41. The hash value is preferably 5 to 10 bits long. The hash value is then stored in a hardware table. Such hardware table can be part of a TLB, such as a TLB 40 that includes a TLB page number field 42, a TLB information field 43 and a hash value field 44, as shown in FIG. 4a. Each entry of TLB 40 is associated with one page.

Subsequently, in response to a "hit" (i.e., a match) on one of the entries within TLB 40 during a cache access, the corresponding hash value within hash value field 44 along with the TLB translation of the matched entry are retrieved from TLB 40. The retrieved hash value is then combined with the remaining cache line index bits (i.e., page bits 7-11) via a hardware logic combine function 45 to form the 10 bits that are actually needed to index a cache set, as shown in FIG. 4b. Since fewer bits are being used to generate the final hash value, combine function 45 can be a simple concatenation of bits or a single-stage XOR logic circuit.

In the example shown in FIG. 4b, the five LSB bits (i.e., bits 7-11 of address) of the cache line-ID are the indexing bits. Bits 12 to 16 are part of the cache page-ID, and are already included in the cache page-ID hash, so only the page-ID hash needs to be combined with the remaining 5 cache line index bits (i.e., bits 7 to 11) to form an actual set index value to index a cache set.

When a TLB entry is allocated to store a new mapping of virtual page ID to real page ID, the real page ID value is hashed. In the example shown in FIG. 4a, there are several possible designs for storing more bits or less bits from the hash of the cache page-ID, with different trade-offs in design complexity and performance. These design alternatives correspond to the choice of the bit numbers of hash value field 44 within TLB 40.

Basically, the hash value does not need to be larger than the number of bits needed to index a set within a cache. In the present example, with the cache containing 1 K sets, the hash value does not need to be more than ten bits. However, since the role of the hash of the full page-ID is to "scatter" or "disperse" address mappings for the high-conflict miss cache sets, a fewer number of bits than the maximum of ten bits may be good enough to achieve such a purpose. For example, if five hash bits are chosen for storage in the TLB, this has the effect of dispersing the cache accesses that would have been to one particular set using the conventional cache addressing scheme to now 32 separate cache sets, thereby spreading the frequent cache accesses to separate sets.

Three different design methods can be used for the width of the page-ID hash value that is stored for use with a particular page, and the method for combining the stored value with the remaining bits of the cache index is described as follows.

i. Use the Maximum Width for the Page ID Hash

In this method, all bits of the page-ID are combined into a full set index. On a page access, these bits are then combined with the line address bits by, for example, XORing the bits together to achieve maximum randomness. With the 1 K cache set in the present example, this means that a 10 page-ID hash bits will be stored in the TLB, and on each page access, the hash bits are combined with the original 10 index bits to from a new 10 bit hash value as the actual set index in the cache. This method yields the maximum randomness and spreading to the set accesses. However, this method also requires chip area for the small XOR logic circuit, and may increase latency to access the cache.

ii. Concatenate Page ID Hash Bits with a Part of the Original Index

In this method, the stored bits are concatenated with a part of original cache line index. Specifically, the part of original cache line index excluding the bits in the page ID. In the present 1 KB cache example, this means the Page-ID contributes 5 bits of hash value, to be concatenated to the LSB 5 bits (i.e., bits 7-11 of address) of the original index bits. No XOR or combining network is required. Without using any logic such as an XOR array to combine the values, this method has no impact on cycle time or latency added to the cache access, and may significantly help circuit timing in high performance caches by eliminating all hashing in critical performance paths. But it might have the problem that, if there are few active pages, then there will be fewer variations in the page-ID hash bits portion of the index, resulting in sub-optimal utilization of the cache.

iii. Hybrid Approach

In this method, some bits of hashed page-ID are combined with some of the original index bits, and the result is then concatenated with the remaining bits. This hybrid approach lies in between methods i. and ii., and therefore achieves less benefit than i. but more than ii. However, this method suffers less latency than method i. but more than method ii.

As a performance/latency compromise, the hybrid approach is also useful to generate the cache set for different cache sizes. Using the same TLB entry bits for all caches, the bits can be combined using different combine functions to generate the specific number of bits to accommodate different numbers of sets in each cache.

To generate the hash value from the page-ID, the commonly used hashing function such as an XOR network should also be good enough for our purposes. In this case, a multi-stage XOR array with a width of only 10 bits or fewer is needed, most likely implemented using a single stage of logic in a 10 to 20 fanout-of-four design frameworks. The page-ID hash value is stored along with the real page ID in the TLB, using a small number of additional bits for each entry.

As described above, the cache set addressing circuit can be changed to combine the existing cache index bits with the page ID hash value. In the example given, the combining can be accomplished with—at most—a single stage XOR array, 10 bits wide or narrower for methods i. and iii. In method ii., in which only concatenation is necessary, no combining logic is needed. The combined hash value from one of these methods is then used to index into a cache set.

As has been described, the present disclosure provides a method and apparatus for minimizing conflict misses in caches.

One advantage of the present invention is that, since the page-ID address bits are now all included in the hash into index of the cache directory for every cache access, maximal spreading of addresses across the cache sets is achieved, which eliminates the cause of the conflict misses for any system or application software being executed in a computer. Another advantage of the present invention is that much of the necessary hardware infrastructure to implement this scheme largely exists already in modern computer systems in the form of a TLB. The TLB holds the mappings between virtual page IDs and real page IDs for the pages that are actively being accessed by a host processor. The hash value of the real page ID can be conveniently stored along with the real page ID in the TLB. In order to store the 5 to 10 bit hash value in the TLB entry for a page, the hash value can be generated after a page fault when a new TLB entry is loaded. Then, the hash generation is no longer in the critical path of the cache access logic.

It is also important to note that although the present invention has been described in the context of a fully functional system, those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. A method for minimizing cache conflict misses, said method comprising:
   providing a translation table having a plurality of entries, wherein each entry includes a page number field and a hash value field;
   generating a hash value from a first group of bits within a virtual address;
   storing said hash value in said hash value field of an entry within said translation table; and
   in response to a match on said entry within said translation table during a cache access, retrieving said hash value of said matched entry from said translation table, and concatenating said hash value with a second group of bits within said virtual address to form a set of indexing bits to index into a cache set.

2. The method of claim 1, wherein said first group of bits is a plurality of most significant bits (MSBs).

3. The method of claim 1, wherein said second group of bits is a plurality of page bits within said virtual address.

4. The method of claim 3, wherein said second group of bits is the five most significant page bits.

5. The method of claim 1, wherein said hash value is represented by at least five bits.

6. The method of claim 1, wherein said translation table facilitates the translation of a virtual address to a real address during a cache access.

7. A computer readable device having a computer program product for minimizing cache conflict misses, said computer readable device comprising:
   computer program code for providing a translation table having a plurality of entries, wherein each entry includes a page number field and a hash value field, wherein said translation table facilitates the translation of a virtual address to a real address during a cache access;

computer program code for generating by a processor a hash value from a first group of bits within a virtual address;

computer program code for storing said hash value in said hash value field of an entry within said translation table; and computer program code for, in response to a match on said entry within said translation table during a cache access, retrieving by said processor said hash value of said matched entry from said translation table, and concatenating by said processor said hash value with a second group of bits within said virtual address to form a set of indexing bits to index into a cache set.

8. The computer readable device of claim 7, wherein said first group of bits is a plurality of most significant bits (MSBs).

9. The computer readable device of claim 7, wherein said second group of bits is a plurality of page bits within said virtual address.

10. The computer readable device of claim 9, wherein said second group of bits is the five most significant page bits.

11. The computer readable device of claim 7, wherein said hash value is represented by at least five bits.

12. The computer readable device of claim 7, wherein said translation table facilitates the translation of a virtual address to a real address during a cache access.

13. An apparatus for minimizing cache conflict misses, said apparatus comprising:

a hash function module for generating a hash value from a first group of bits within a virtual address;

a translation table having a plurality of entries, wherein each entry includes a page number field and a hash value field, wherein said translation table facilitates the translation of a virtual address to a real address during a cache access, wherein said hash value is stored in said hash value field of an entry within said translation table;

means for, in response to a match on said entry within said translation table during a cache access, retrieving said hash value of said matched entry from said translation table; and a combine function module for concatenating said hash value with a second group of bits within said virtual address to form a set of indexing bits to index into a cache set.

14. The apparatus of claim 13, wherein said first group of bits is a plurality of most significant bits (MSBs).

15. The apparatus of claim 13, wherein said second group of bits is a plurality of page bits within said virtual address.

16. The apparatus of claim 15, wherein said second group of bits is the five most significant page bits.

17. The apparatus of claim 13, wherein said hash value is represented by at least five bits.

18. The apparatus of claim 13, wherein said translation table facilitates the translation of a virtual address to a real address during a cache access.

* * * * *